(12) United States Patent
Aoki (10) Patent No.: US 7,224,778 B2
(45) Date of Patent: May 29, 2007

(54) METHOD AND APPARATUS FOR MANAGING SUBSCRIPTION-TYPE MESSAGES

(75) Inventor: Norihiro Edwin Aoki, Sunnyvale, CA (US)

(73) Assignee: AOL LLC., Dulles, VA (US)

( * ) Notice: Subject to any disclaimer, the term of this patent is extended or adjusted under 35 U.S.C. 154(b) by 206 days.

(21) Appl. No.: 10/750,598

(22) Filed: Dec. 30, 2003

(65) Prior Publication Data

US 2005/0147221 A1    Jul. 7, 2005

(51) Int. Cl.
*H04M 1/64* (2006.01)

(52) U.S. Cl. .............. 379/88.23; 379/88.13; 709/206; 707/10

(58) Field of Classification Search ........... 379/88.12, 379/88.13, 88.23, 100.08; 709/206; 707/10
See application file for complete search history.

(56) References Cited

U.S. PATENT DOCUMENTS

| | | | | |
|---|---|---|---|---|
| 5,619,648 | A | 4/1997 | Canale et al. ......... 395/200.01 |
| 5,999,932 | A * | 12/1999 | Paul ............................ 707/10 |
| 6,023,723 | A * | 2/2000 | McCormick et al. ....... 709/206 |
| 6,052,709 | A | 4/2000 | Paul ........................... 709/202 |
| 6,112,227 | A | 8/2000 | Heiner |
| 6,212,265 | B1 | 4/2001 | Duphorne ................... 379/142 |
| 6,230,188 | B1 | 5/2001 | Marcus ....................... 709/206 |
| 6,236,768 | B1 | 5/2001 | Rhodes et al. ............... 382/306 |
| 6,249,807 | B1 | 6/2001 | Shaw et al. ................ 709/206 |
| 6,282,565 | B1 | 8/2001 | Shaw et al. ................ 709/206 |
| 6,321,267 | B1 | 11/2001 | Donaldson .................. 709/229 |
| 6,324,569 | B1 | 11/2001 | Ogilvie et al. .............. 709/206 |
| 6,370,139 | B2 | 4/2002 | Redmond .................... 370/354 |
| 6,438,583 | B1 | 8/2002 | McDowell et al. ......... 709/206 |
| 6,453,327 | B1 | 9/2002 | Nielsen ....................... 707/500 |
| 6,460,050 | B1 | 10/2002 | Pace et al. ............... 707/104.1 |
| 6,480,885 | B1 | 11/2002 | Olivier ........................ 709/207 |
| 6,484,197 | B1 | 11/2002 | Donohue .................... 709/206 |
| 6,487,586 | B2 | 11/2002 | Ogilvie et al. .............. 709/206 |

(Continued)

FOREIGN PATENT DOCUMENTS

EP    946022    9/1999

(Continued)

OTHER PUBLICATIONS

Blankenhorn, D.; *E-mail Audits Clean Lists, Improve Response Rates*; B to B; Jun. 10, 2002; USA.

(Continued)

*Primary Examiner*—Gerald Gauthier
(74) *Attorney, Agent, or Firm*—Michael A. Glen; Glenn Patent Group (57) ABSTRACT

A method and apparatus for managing subscription-type arrangements involving a recurring series of messages sent to a plurality of user recipients on a communications network is disclosed. Incoming messages are monitored by a filtering agent, and message attributes are compared to corresponding parameters stored in a database to block certain messages from unauthorized sources and forward authorized messages to an addressee. Provisions are made for a communications service provider to create special arrangements with commercial partners to facilitate the starting, modification, and canceling of subscription arrangements. Individual user recipients can independently contact the commercial partners, third-party commercial entities, individual or groups to establish a subscription-type arrangement. Various forms and procedures enable a subscription manager component to keep track of all such arrangements in the database.

30 Claims, 9 Drawing Sheets

U.S. PATENT DOCUMENTS

| | | |
|---|---|---|
| 6,496,855 B1 | 12/2002 | Hunt et al. ................. 709/217 |
| 6,505,236 B1 | 1/2003 | Pollack ....................... 709/206 |
| 6,587,550 B2 * | 7/2003 | Council et al. ........ 379/100.08 |
| 2004/0139165 A1 | 7/2004 | McMillan et al. |
| 2004/0181571 A1 | 9/2004 | Atkinson et al. |

FOREIGN PATENT DOCUMENTS

| | | |
|---|---|---|
| EP | 1143661 | 10/2001 |
| EP | 1143662 | 10/2001 |
| EP | 1143663 | 10/2001 |
| EP | 1143664 | 10/2001 |
| EP | 1143665 | 10/2001 |
| EP | 1143681 | 10/2001 |
| EP | 1223527 | 7/2002 |
| WO | 01/80535 | 10/2001 |

OTHER PUBLICATIONS

Sahami, M. et al; *A Bayesian Approach to Filtering Junk E-Mail*; www.CiteSeer.; Papers from 1998 Workshop; Stanford.edu/users/sahami/pap . . . spam.ps.

Crawford, E., et al; *Automatic Induction of Rules for E-Mail Classifications*; Basser Department of Computer Science, University of Sydney; E. McCreath: Department of Computer Science, The Australian National University.

Carreras, X.; *Boosting Trees for Anti-Spam Email Filtering*; TALP Research Center, LSI Department, Universitat Politecnica de Catalunya.

Katirai, H.; *Filtering Junk E-Mail*; Department of Electrical & Computer Engineering, University of Waterloo.

Provost, J.; *Naive-Bayes vs. Rule-Learning in Classification of Email*; Department of Computer Sciences, The University oofTexas at Austin.

Joachims, T.; *Transductive Inference for text Classifications Using Support Vector Machines*; Universitat Dortmund.

Manheimer, K., et al; *Mailman—An Extensible Mailing List Manager Using Python*; Corporation for National Research Initiatives; J. Viega; Reliable Software Technologies.

Ranum, M., et al; *Implementing a Generalized Tool for Network Monitoring*; USENIX; Proceedings of the Eleventh Systems Administration Conference (LISA '97); Oct. 26-31, 1997.

Schapire, R.; *The Boosting Approach to Machine Learning An Overview*; AT & T Labs—Research Shannon Laboratory; Dec. 19, 2001.

Schohn, G., et al; *Less is More: Active Learning with Support Vector Machines*; Just Research.

Liew Kwek Sing, N.; *ICQ AOL ICQ vs. MSN Messenger*; University of Southampton, Dept of Electronic and Computer Science, CM316 Multimedia Systems Coursework; http://www.icq.com.

Androutsopoulos, I., et al; *Learning to Filter Spam E-Maill: A Comparison of a Naïve Bayesian and a Memory-Based Approach*; Department of Informatic, University of Athens, Geece {ionandr, paliourg, Vangelis, cosass}@iit.demokritos.gr; {stud0936, T. Stamatopoulos}@di.uoa.gr.

Heels, E.J.; *Combating Spam*; Law Practice Mgmt, vol. 28,No. 6, p. 9, 12; ABA; Sep. 2002; USA.

Pedley, P.; *Data Protection Issues for Intranets and Web Sites*; Business Information Review, vol. 19, No. 3, p. 41-9; Bowker-Sauer, Sep. 2002; UK.

Chu, F.; *Applicance Keeps Email Safe*; IT Week; vol. 5,No. 19, p. 31; VNU Business Publications; May 13, 2002; UK.

Armstrong, I; *Contending with Spam*; Secure Computing (Intn'l Ed.); p. 38,40; West Coast Publishing; May 2002; UK.

McLachlan, D.; *How to Avoid Choking on Your Spam*; CA Magazine; p. 52-53; Mar. 2002; UK.

Mazzucca, M.; *Email Security: Dangerous Waters Ahead*; Secure Computing (Intnl Ed); p. 24-30; Aug. 2001; UK.

Champeon, S.; *Save Your Site From Spambots: Techniques to Prevent Address Scraping*: WEB Techniques; vol. 6,No. 8, p. 41-43; CMP Media, Inc.; Aug. 2001; USA.

Rae, D.; *Spammed and Deliver {email}*; Network News; UK Edition; p. 37-39; Apr. 25, 2001; UK.

Roussopoulos, M., et al; *Person-Level Routing in the Mobile People Architecture*; 2nd USENIX Symposium on Internet Technologies and Systems; Conf. Oct. 11-14, 1999; Boulder, Colorado; USENIX Assoc, Berkeley, CA, USA.

Cranor, L.F.; et al; *Spam![Junk E-mail]*; Communications of the ACM; vol. 41 .No. 8, p. 74-83; Aug. 1998; USA.

Collinson, P.; *Putting a Stop to Spam*; EXE Journal; vol. 12,No. 6, p. 18-19, 21-2, 24; Centaur Communications; Nov. 1997; UK.

* cited by examiner

USER ADDRESS: ABCD@AOL.COM

NAME OF SENDER: _____________

SOURCE ADDRESS: _____________

SUBSCRIPTION ID CODE NAME: ___

_______________________________

AOL PARTNER: <u>YES OR NO</u>

PLEASE CANCEL THIS SUBSCRIPTION

272

START NEW SUBSCRIPTION

USER ADDRESS: ABCD@AOL.COM

NAME OF SENDER: _____________

SOURCE ADDRESS: _____________

SUBSCRIPTION ID CODE NAME: ___

_______________________________

AOL PARTNER: <u>YES OR NO</u>

METHOD AND APPARATUS FOR MANAGING SUBSCRIPTION-TYPE MESSAGES

BACKGROUND OF THE INVENTION

1. Field of the Invention

This invention relates generally to communication networks, and more specifically to subscription-type messages between a source and a plurality of message users.

2. Description of the Prior Art

The widespread use of communication networks has created both new opportunities, as well as a set of new problems. The opportunities include the possibility for user recipients to receive periodic messages from commercial or third party sources without having to request them separately. The problems include the potential deluge of unsolicited messages sent to user recipients.

Keeping track of subscriptions has become burdensome and inefficient for recipient users. Similarly, the originators of a series of messages or message subscriptions also have difficulties in maintaining updated records of active subscribers, soliciting new subscribers, and identifying which subscribers no longer want to receive messages or subscription material.

Message service providers and their commercial message source partners are often blamed by recipient users who receive unwanted messages or subscription material.

SUMMARY OF THE INVENTION

The invention provides methods and apparatus for managing legitimate subscription-type messages received by a recipient user of a communications network from known commercial sources, as well as from known individual or group sources A related aspect of the invention provides a filtering process for identifying and intercepting broadcast-type messages sent from unauthorized sources to an addressee.

Various embodiments are provided for managing subscription-type arrangements involving a recurring series of messages sent to a plurality of user recipients on a communications network. The incoming messages are monitored by a filtering agent to identify message attributes, which are compared to corresponding parameters stored in a database to block certain messages from unauthorized sources and forward authorized messages to an addressee.

There are provisions in some embodiments for a communications service provider to create special arrangements with commercial partners to facilitate the starting, modification, and canceling of subscription arrangements. Individual user recipients can independently contact the commercial partners, third-party commercial entities, individuals, or groups to establish a subscription-type arrangement. Various forms and procedures enable a subscription manager component to keep track of all such arrangements in the database.

One aspect of the invention provides techniques for creating an approved list of message sources in a subscription database that can be controlled and revised by a recipient. A related aspect provides a subscription manager of a message service provider to facilitate the maintenance and updating of such an approved list.

A further aspect provides techniques for screening and inspecting selected incoming communications to intercept subscription-type messages from unauthorized sources. A related aspect provides techniques for screening and inspecting selected outgoing communications to ascertain changes that have occurred in a list of approved subscriptions for a particular user recipient.

Some embodiments of the invention provide a subscription management system for message service providers that have commercial message source partners to facilitate the solicitation, acceptance, maintenance, updating, and cancellation of subscription arrangements between such message source partners and recipient users of the message service provider.

Certain embodiments of the invention provide a data structure for keeping track of subscription parameters. An aspect of such a data structure may include a name of a subscription provider, a source address for subscription material, a code name ID for a particular subscription, a destination address for a user recipient, a proxy address for receiving subscription messages and subscription material, and/or a status indicator for a particular subscription.

Various aspects of the invention may be implemented in a message communication system for transmitting messages by telephone networks, cable networks, satellite networks, transmission tower networks, wide area networks (WAN), local area networks (LAN), World Wide Web networks, radio networks, television networks, wireless networks, and the like.

The invention may be implemented in network systems providing textual messages, audio messages, video messages, image messages, graphics messages, inventory messages, catalog messages, product sales/servicing messages, photographic messages, data messages, and the like. A related aspect of the invention may include implementations of the invention in interactive real time messaging services that provide textual, audio and/or video communications between individual and group participants.

DESCRIPTION OF EXEMPLARY EMBODIMENTS OF THE INVENTION

The various embodiments of the invention provide recipient users of a communications network with ways to manage the receipt and processing of legitimate recurring messages, such as subscription-type messages that are addressed to them. The invention also provides a way for originators of subscription-type messages to manage the distribution of maintenance and content messages to user recipients on a communications network.

One feature of the invention puts primary control of subscription-type messages back in the hands of recipient users and provides them with tools to manage the legitimate recurring messages received at a destination address. Such recurring messages may be a result of a formal subscription arrangement with third-party individuals, groups, commercial entities, or specific commercial partners of a message service provider. In some instances, an arrangement may be characterized as a license for a particular commercial entity to send various types of messages to a recipient user.

Implementations of the invention may incorporate filtering rules stored in a subscription database accessible to a recipient user, as well as being accessible to a message service provided. A subscription manager may process incoming messages and determine whether an individual message matches the filtering rules and is therefore part of an approved arrangement with the recipient user and the message originator.

An example of a recurring message that is authorized by a recipient user is a newsletter periodically sent out as a broadcast type message. Signing up for such a newsletter is a relatively straightforward process using, for example, the World Wide Web. At a Web site of a commercial entity, a user enters a destination email address, clicks a button, and thereby initiates a subscription arrangement to receive subscription material such as a newsletter. Sometimes a Web site employs a double opt-in registration system and delays sending the subscription material until a user recipient returns a confirmation message sent to the destination email address.

It may be easier for a message service provider to help manage subscription-type arrangement if a message originator is a commercial partner with the service provider. A typical agreement includes having the partner provide certain information on their operation such as the source address and/or alias address from which a subscription-type message is sent. Upon receiving a message from such source address, a service provider routes that mail to a special queue that feeds a filtering agent incorporated as part of a subscription manager component.

In a single opt-in registration system a user initiates and completes the subscription arrangement on a single visit to the partner's Web site. Thereafter, the subscription manager component monitoring incoming messages notices that a message from a commercial email partner is directed to a user recipient's mailbox. If this is a new subscription not already listed in a subscription database associated with the subscription manager, the filtering agent detects and labels this message for special processing. For example, the subscription manager component may proactively prompt the user and request confirmation that the user in fact has requested this subscription material. Such confirmation from the user may include asking the user to provide additional information to be included in the subscription database.

Depending upon whether the user confirms or disables confirmation, the new subscription may be added as an approved subscription for that user in the subscription database. As part of the subscription creation process, the subscription manager may also determine the subscription maintenance method and origination address either by parsing the message or from information previously provided by the partner. The subscription manager can then employ these two information parameters to assist the user with managing the subscription in the future.

In a double opt-in situation the subscription manager may create a new subscription in the subscription database, but may also auto-generate a return email confirmation or generate a Web site hit confirmation to the partner. In either case, the incoming mail procedure is a reaction to an incoming commercial message that achieves the purpose of obtaining the user's consent and creating a listing of a new approved subscription for that user.

Messages received as part of an existing subscription arrangement with a partner may be detected by matching selected message attributes with the subscription database. This matching process can be established to be very rigorous with multiple confirmation features or very loose with only one or two reliable individual confirmation features. For example, different parameters in the subscriptions data base could be matched with certain message attributes, such as specific terms or code names in the subject line, or indicia displayed in an X-header, and/or an alias address or other origination address of the message, and/or a proxy destination address for the recipient user.

It is therefore possible to assure that all mail originating from a commercial email partner's dedicated source address to the message service corresponds either to an existing subscription or a potential new subscription. In the event unauthorized mass mailings are received and detected by the filtering agent, the source can be identified as a spammer and appropriate measures taken to remedy the situation.

Furthermore, the processing of incoming messages to detect a subscription status is virtually transparent from a user perspective. The user signs up for a newsletter or the like in an accustomed way, and those newsletters or other recurring types of messages are funneled through the subscription manager by virtue either of prior operational agreements between the service provider and the partner, or from other third-party commercial sources, individuals, or groups.

Because the subscription manager component keeps track of all the confirmed subscriptions for each user, both independent third party subscriptions as well as commercial partner subscriptions, the invention can maintain and periodically provide to a user a list of all such subscriptions. Thus, a set of relatively sophisticated filter rules is provided to automatically monitor and process incoming messages relating to a user independently initiating a subscription from either a third party source, or from a commercial partner of the message service provider.

The feature of the filtering agent may include differentiating between subscription-type messages having content only, and those relating at least partially to management and operation of the subscription arrangement. Certain of these management factors may be incorporated in the subscription database for determining status, as well as procedures for maintaining, modifying, or canceling a subscription, and how and where to send messages to the third-party or partner relating to such issues.

Figure 1:
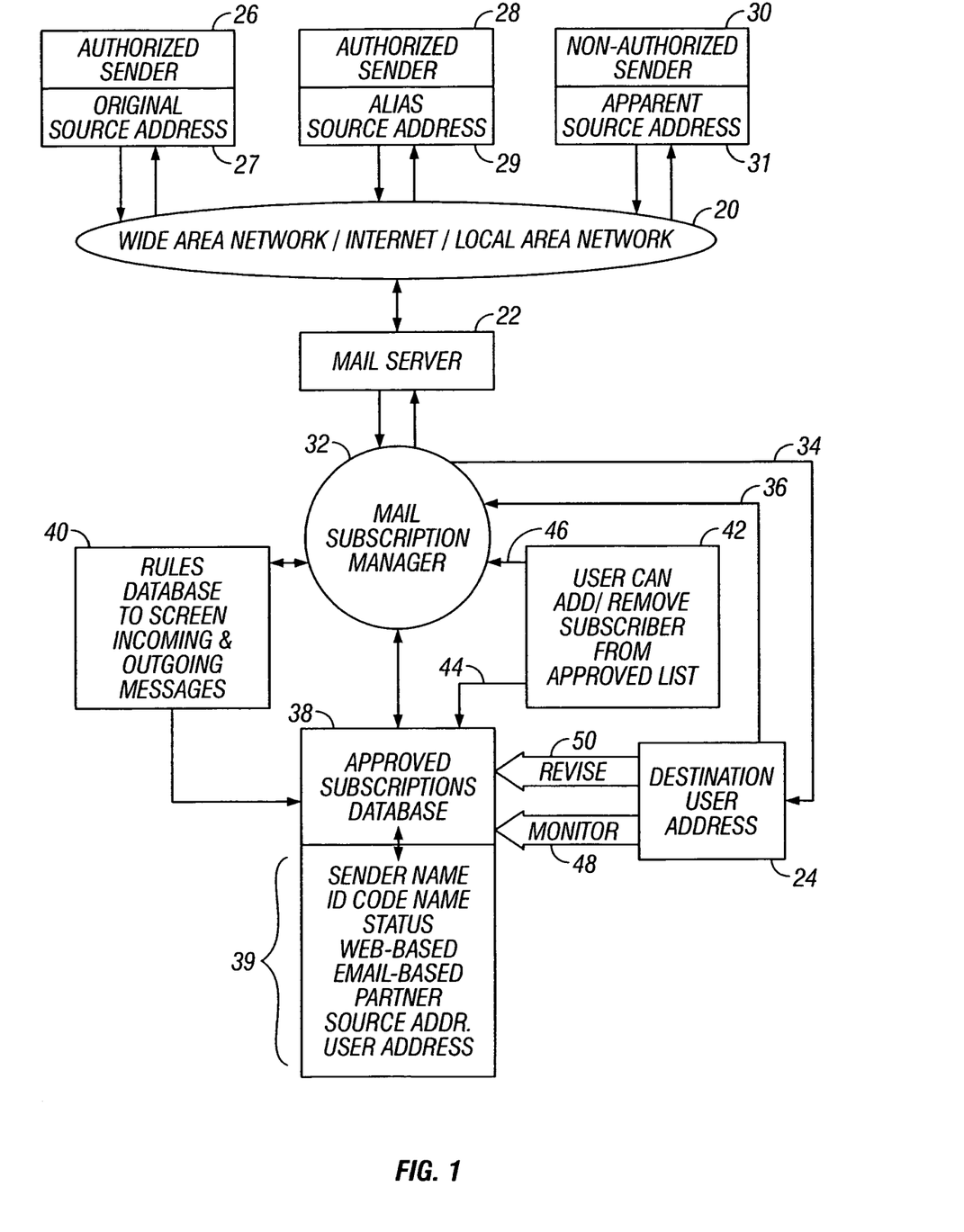
FIG. 1 is a block diagram showing an embodiment of the invention incorporating an email subscription manager for destination users that send and receive messages on communication networks.

Referring to an exemplary embodiment shown in FIG. 1, a communication network 20 such as a wide area network (WAN), the Internet, a local area network (LAN), or the like provides communications through a mail server 22 to one or more destination user addresses, such as 24 which are typically provided by a message service provider, such as an Internet Service Provider (ISP). There are many types of message originators that are familiar with the user address 24 and would like to send a message to the addressee at the user address 24. Such message originators may include an authorized sender 26 with an original source address 27, an authorized sender 28 that uses an alias source address 29, and a non-authorized sender 30 that uses an apparent source address 31.

Incoming messages are preferably routed through a mail subscription manager 32 that acts as a filtering agent to inspect each selected message that may qualify as a possible subscription-type of recurring message. An approved subscriptions database 38 along with a rules database 40 are used by the subscription manager 32 to screen out as many unauthorized broadcast messages as possible and prevent their delivery to the destination user address 24. Any messages that are not deemed candidates for inspection, as well as authorized subscription-related messages, are eventually routed 34 to the destination user address 24. Although the invention is applicable to passive, receive only destination user addresses, most users also have the capability to send outbound messages that preferably are routed 36 via the subscription manager 32 through a server 22 and the network 20 to their destinations.

A listing of approved message sources is maintained for each individual destination user address 24, along with predetermined parameters, such as those indicated by bracket 39. Such a listing, as well as its associated parameters, may be controlled and periodically updated by a user (see 42) through direct communications 44 with the database 38 or through indirect communications 46 via the subscription manager 32. Although diverse ways of accomplishing such communications are available, it may be easier and most efficient to initiate such communications from the destination user address 24 of the addressee as shown by 50. Also, it is desirable for an individual user to monitor 48 the subscription database from time to time.

Figure 2:
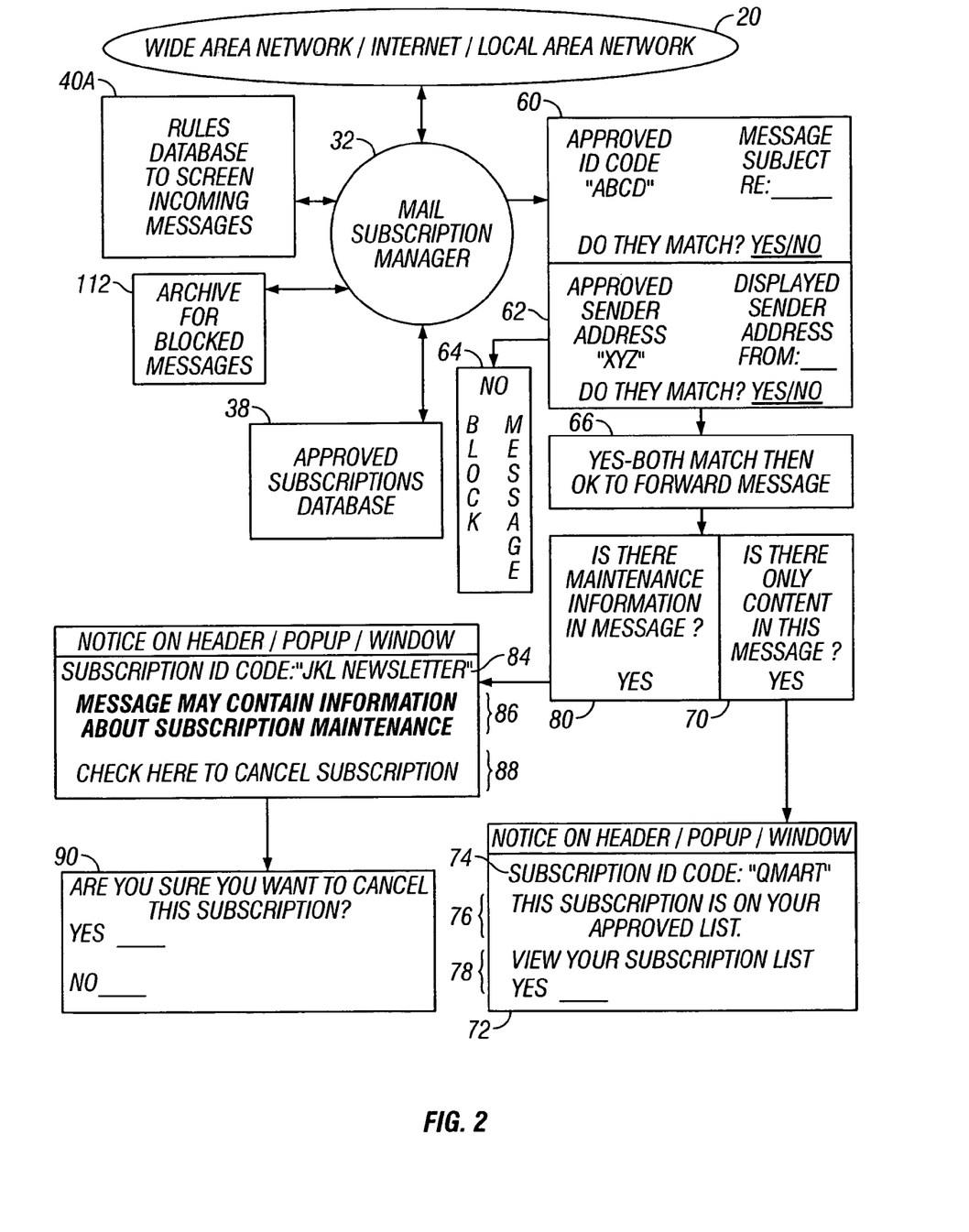
FIG. 2 is schematic block diagram and flow chart showing an embodiment of the invention for processing incoming messages.

The exemplary embodiments of FIG. 2 include various implementations for processing incoming messages by the subscription manager 32 using the approved subscriptions database 38 in conjunction with the rules database 40a. Although authentication of an incoming message may be based on matching a single message attribute with a corresponding parameter in the database, improved reliability is provided by using at least two or more attributes as shown at 60, 62. If a satisfactory match is not made by the subscription manager component, then the message is preferably blocked 64 from delivery to its intended destination, and may be stored for future analysis and use in an archive 112. However, if the screened message is confirmed through the matching process 66 as an authorized message, it may be further processed to determine whether it contains only content 70, or instead includes maintenance information 80 regarding the status of the subscription-type arrangement. Content messages, as well as maintenance-related messages, may be forwarded directly to the destination user address or alternatively provided with respective informational display notices 72, 82. Such an informational notice 72 for content messages may include a subscription ID code 74, an indication such as 76 that this message was found to be on the approved listing in the database, and a prompt for viewing the current subscription list 78. Such an informational notice 82 for operational/maintenance messages may include a subscription ID code 84, a reminder that the message may contain subscription status information, and a prompt for canceling the subscription. If cancellation is requested, the subscription manager may optionally require a double opt-out confirmation 90 to avoid inadvertent cancellations.

Figure 3:
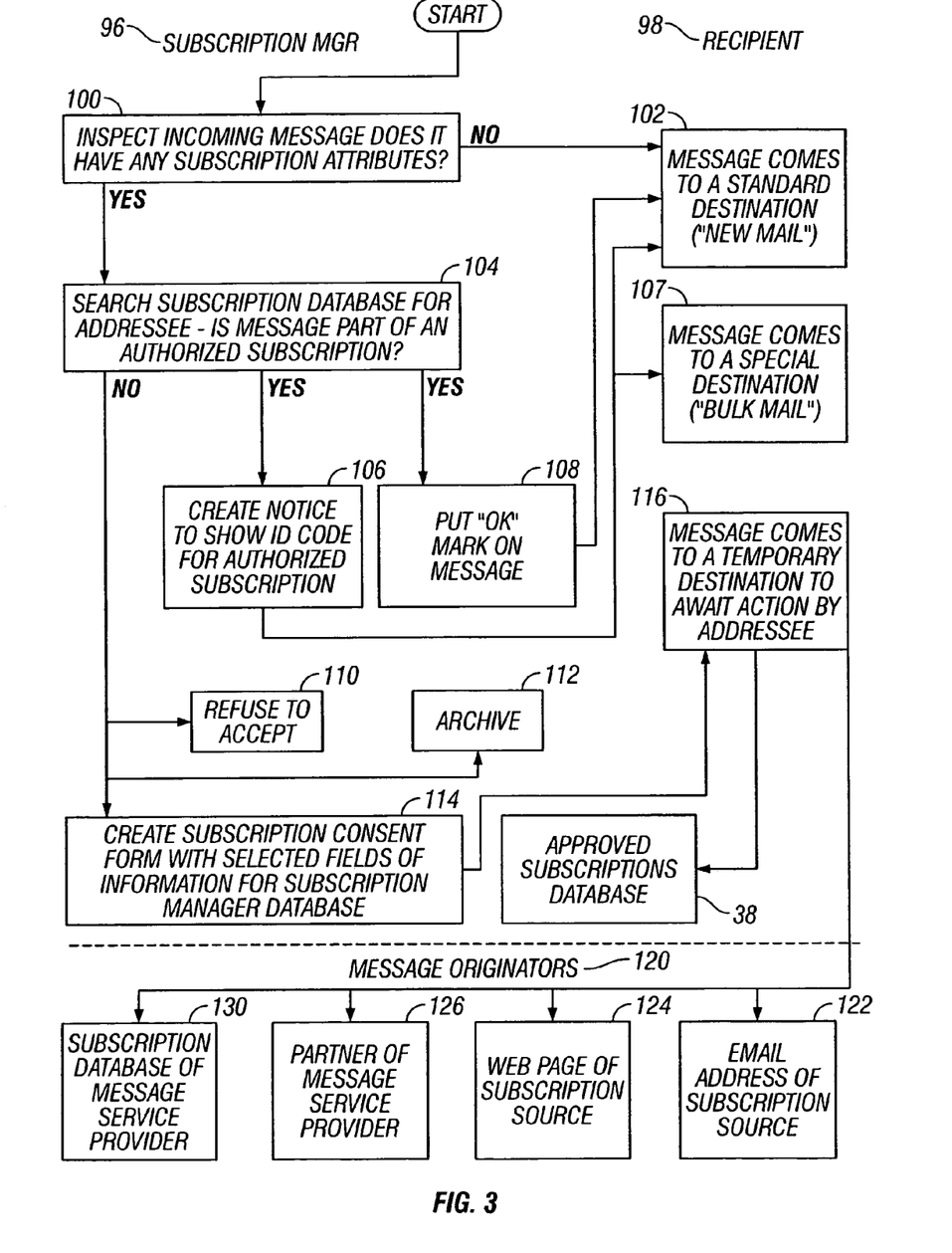
FIG. 3 is a detailed flow chart for an embodiment of the invention for processing incoming messages.

A self-explanatory flow chart is shown in FIG. 3 to disclose different implementations and choices for achieving the benefits of the invention. A typical sequence may include an initial inspection of an incoming message to find any subscription-type attributes 100. In the event no such attributes are found, the message is routed directly to a standard mail destination 102 such as new mail. Where attributes are found, a database search is made 104 to determine whether the message is part of an approved subscription for this addressee. If no match is found, the message may be refused 110 and possibly returned, or it may be sent to an archive 112 for future reference or further analysis. In some instances, it may nevertheless be helpful to forward the non-authenticated message to a temporary destination 116 at the user address along with a subscription consent form to give a choice to the destination addressee. Such temporary destination could be isolated from other messages, or received as bulk mail 109 or standard mail 102 with an appropriate action requested designation. If a new subscription approval results, confirmation information is preferably sent automatically to update the approved subscriptions database 38 and is also sent to a designated message originator 120.

Where authentication occurs by the comparison and matching process 104, the authorized message is forwarded to its intended address destination with preferably a marking 108 that indicate to the user addressee that this message is deemed OK, and/or a notice 106 identifying the ID code for this approved subscription arrangement. The specific destination may be either a standard new mail destination 102 or a special destination 17, such as bulk mail.

As further shown in the flow chart of FIG. 3, the subscription manager and associated database assures that coordinated updated subscription information is automatically provided to the service provider's database 130, as well as sent to any and all types all types of message originators, including but not limited to partners 126, subscription sources with Web page interfaces 124 and subscription sources with email interfaces 122.

Figure 4:
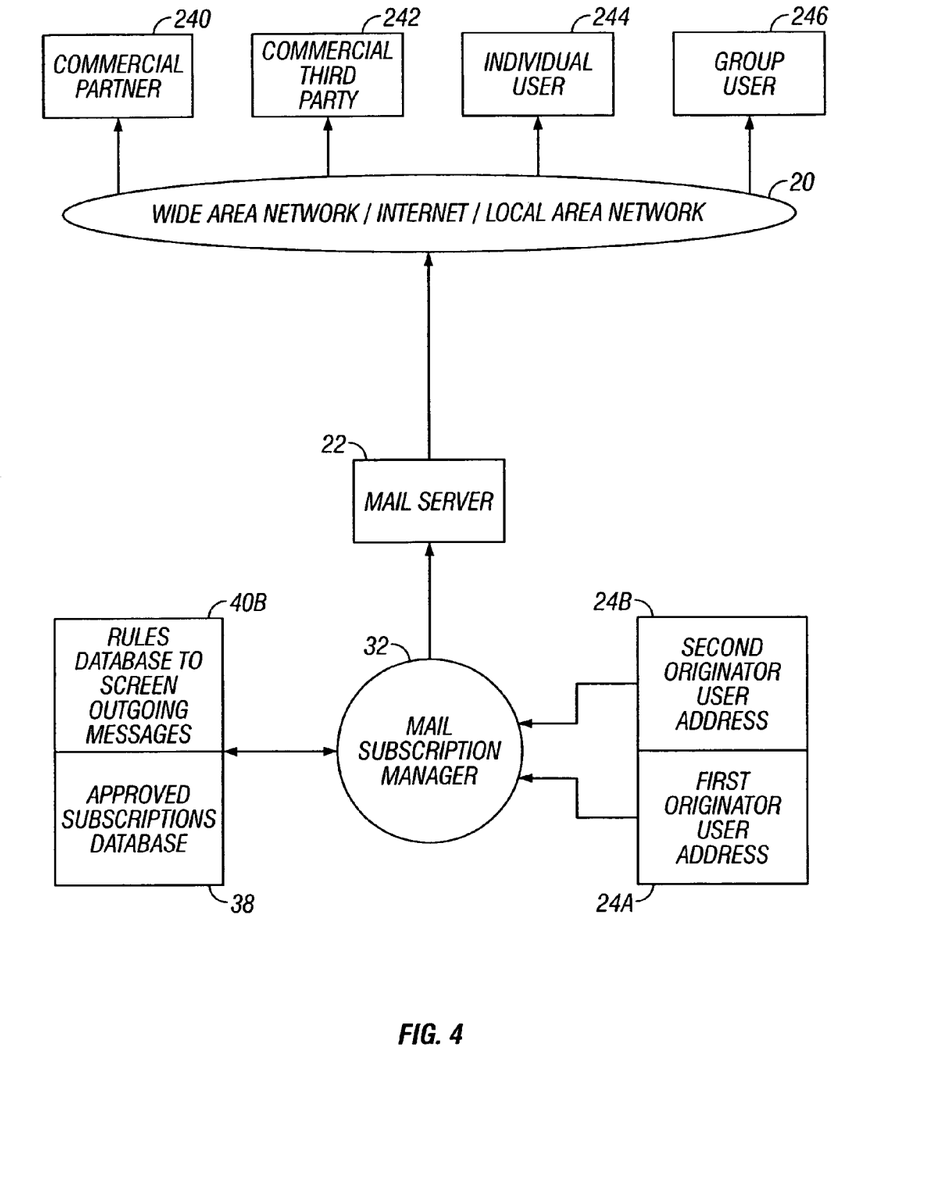
FIG. 4 is a schematic block diagram and flow chart showing an embodiment of the invention for processing outgoing messages.

Referring to FIG. 4, a block diagram illustrates how outgoing messages from first and second user addresses 24a, 24b are transmitted via the mail subscription manager 32 for selective screening in conjunction with the rules database 40b and the approved subscriptions database 38 to the mail server 22. Distribution of the messages occurs through a communications network 20 to appropriate destinations, such as a commercial partner 240, a commercial third party 242, an individual user 244, or a group user 246.

Figure 5:
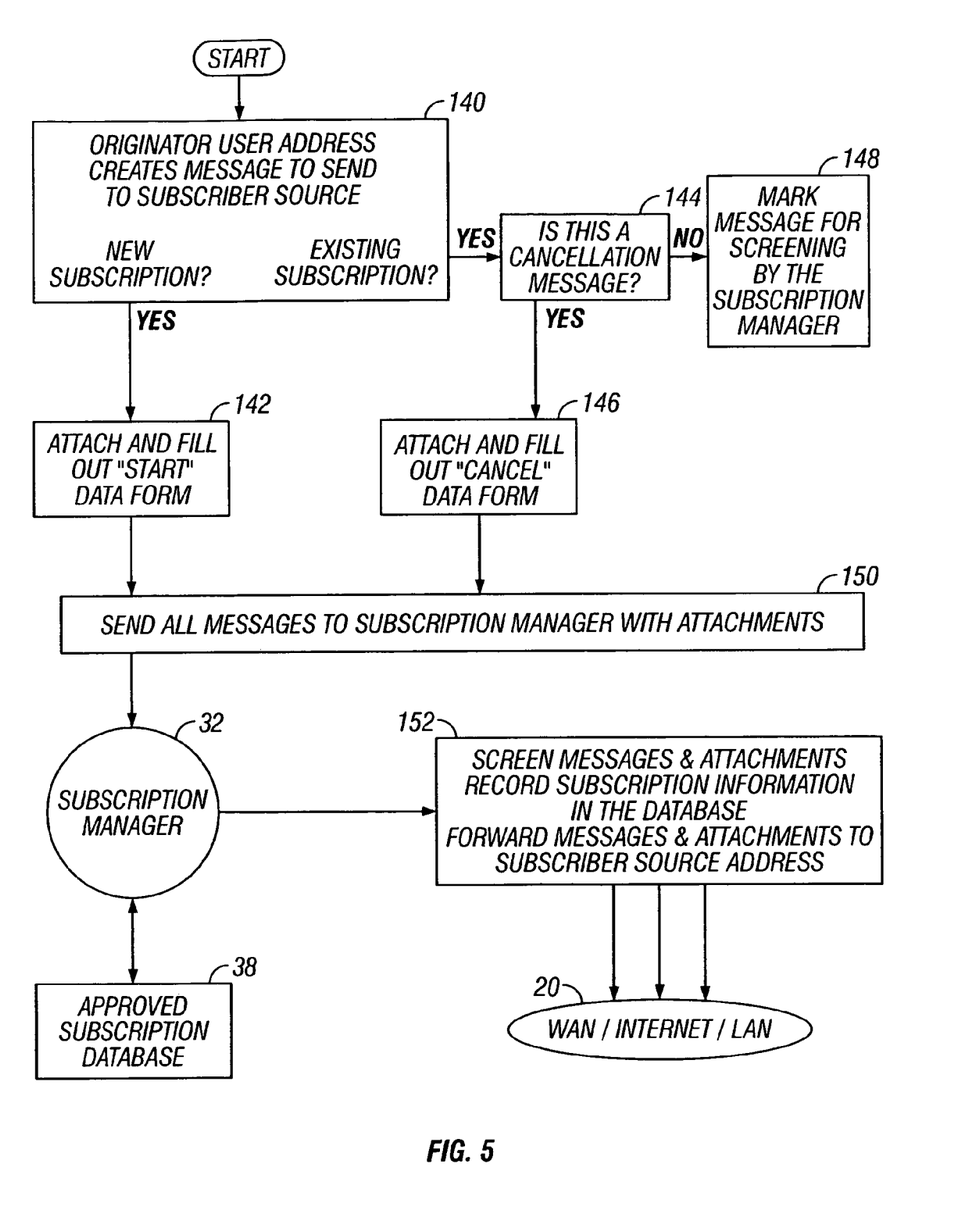
FIG. 5 is a detailed flow chart for an embodiment of the invention for processing outgoing messages.

The self-explanatory flow chart of FIG. 5 shows an exemplary processing sequence for outbound messages. Messages are screened to identify subscription-related topics in the message 140 and a differentiation is preferably made between a new subscription related message and an existing subscription message. Cancellation messages 144 are preferably sent along with a filled out "Cancel" data structure form 146 to the subscription manager for further inspection and processing 150. After recording appropriate updated information in the database 152, the message and attachment are forwarded to subscriber source address via communication network 20. Non-cancellation messages are marked for screening 148 by the subscription manager, and are then similarly routed, processed and forwarded 150, 152.

When an outgoing message involves a new subscription arrangement, an attached and filled out "start" data structure form 142 is similarly sent to the subscription manager for further inspection, processing, and database updating 150, 152 before being forwarded to the subscriber source destination.

Figure 6:
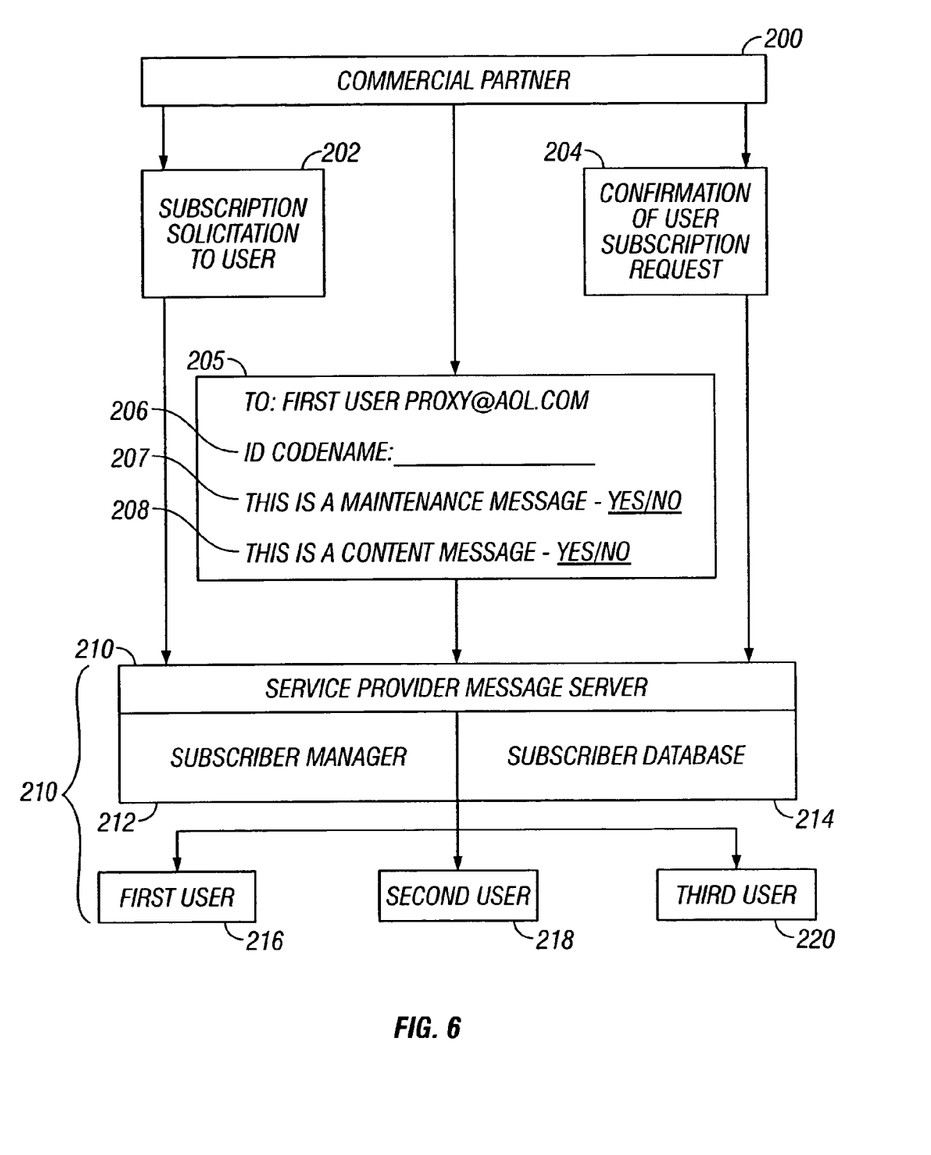
FIG. 6 is a block diagram showing an embodiment of the invention implemented in a communication system having a message service provider with commercial message source partners.

An operating agreement between a communication service provider system 210 and a commercial partner 200 makes the benefits of the invention easier to be achieved. As shown in FIG. 6 the business partner 200 may receive preferential processing of its subscription solicitations 202 and confirmations 204, and by using a message form 205 with specially formatted fields for ID code name 206, subscription maintenance messages 207, and content messages 208 the service provider system 210 is better able to process such messages through server 210 and subscriber manager 212 to update accurately its database 214 and promptly forward such messages to the designated user address destination such as 216, 218 or 220.

Figure 7:
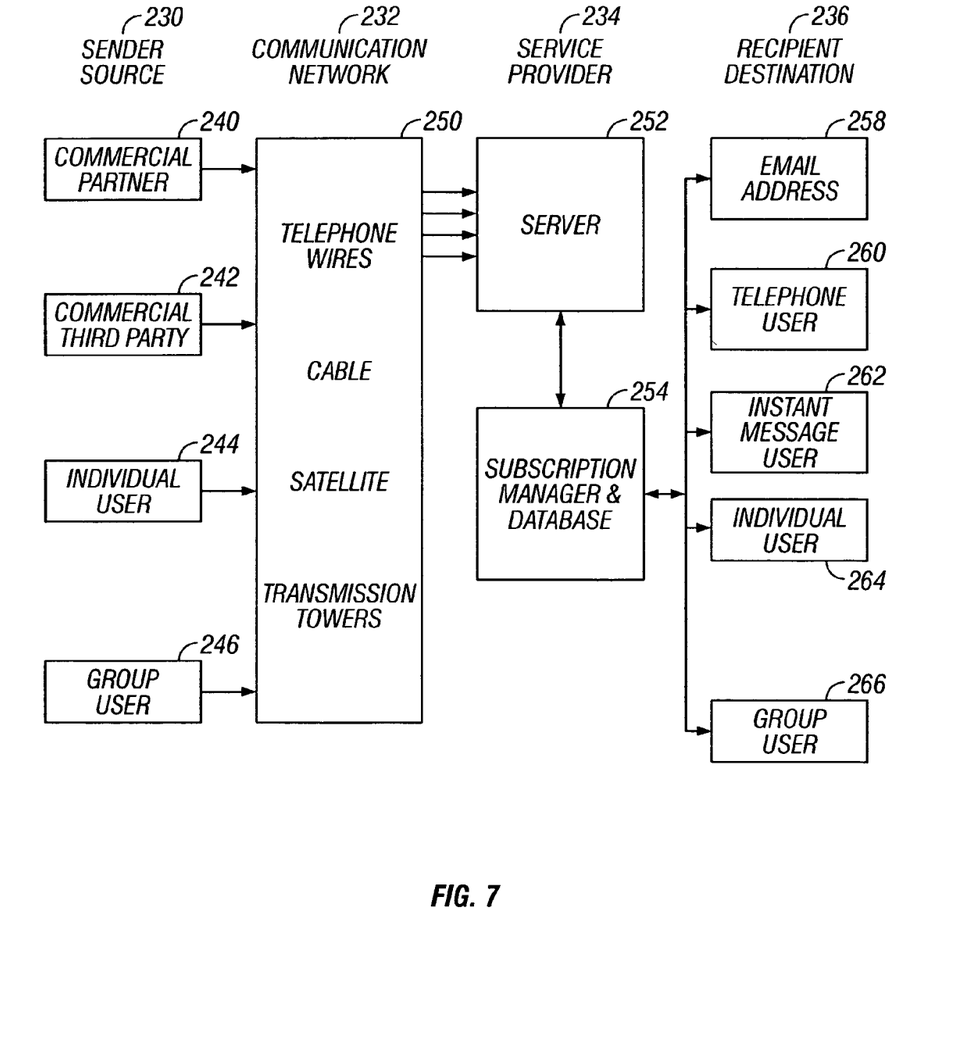
FIG. 7 is a block diagram showing possible implementations of the invention in various exemplary types of communication systems.

Although illustrated embodiments emphasizing implementations of the invention in email communication systems, FIG. 7 show a widespread applicability of the invention features with communication networks 232, including but not limited to telephone wires, cable, satellite, and transmission tower systems 250. Moreover a recipient destination is not limited to email addresses 258, but may include other communication user interfaces and systems including but not limited to telephonic users 260, instant messaging (IM) users 262, and diverse types of individual 264 and group users 266.

Figure 8:
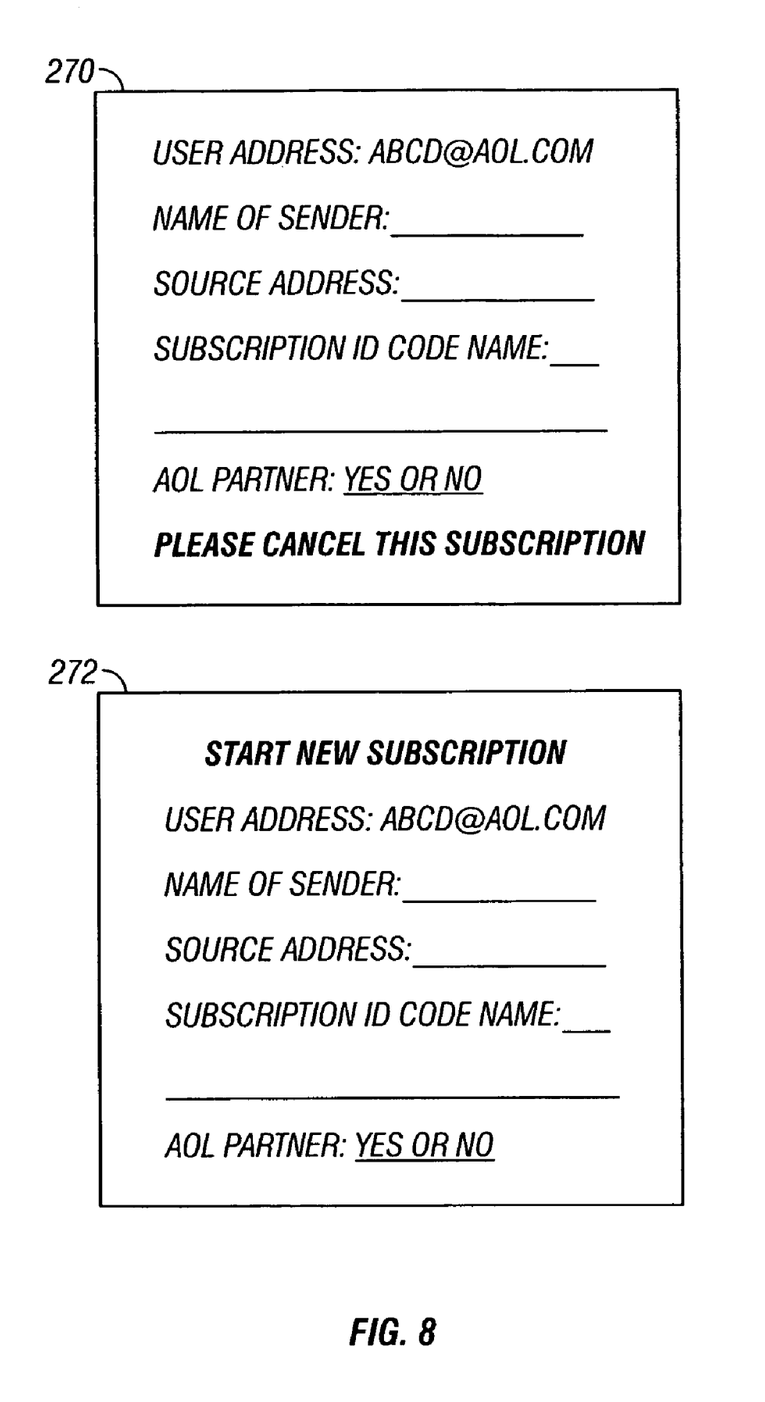
FIG. 8 shows exemplary data structures for starting a new messaging subscription and for canceling an existing message subscription.

Referring to FIG. 8, the creation and use of standardized data structures such as cancellation form 270 and new subscription form 272 provide important parameter information for the subscription manager database as well as for subscription sources.

Figure 9:
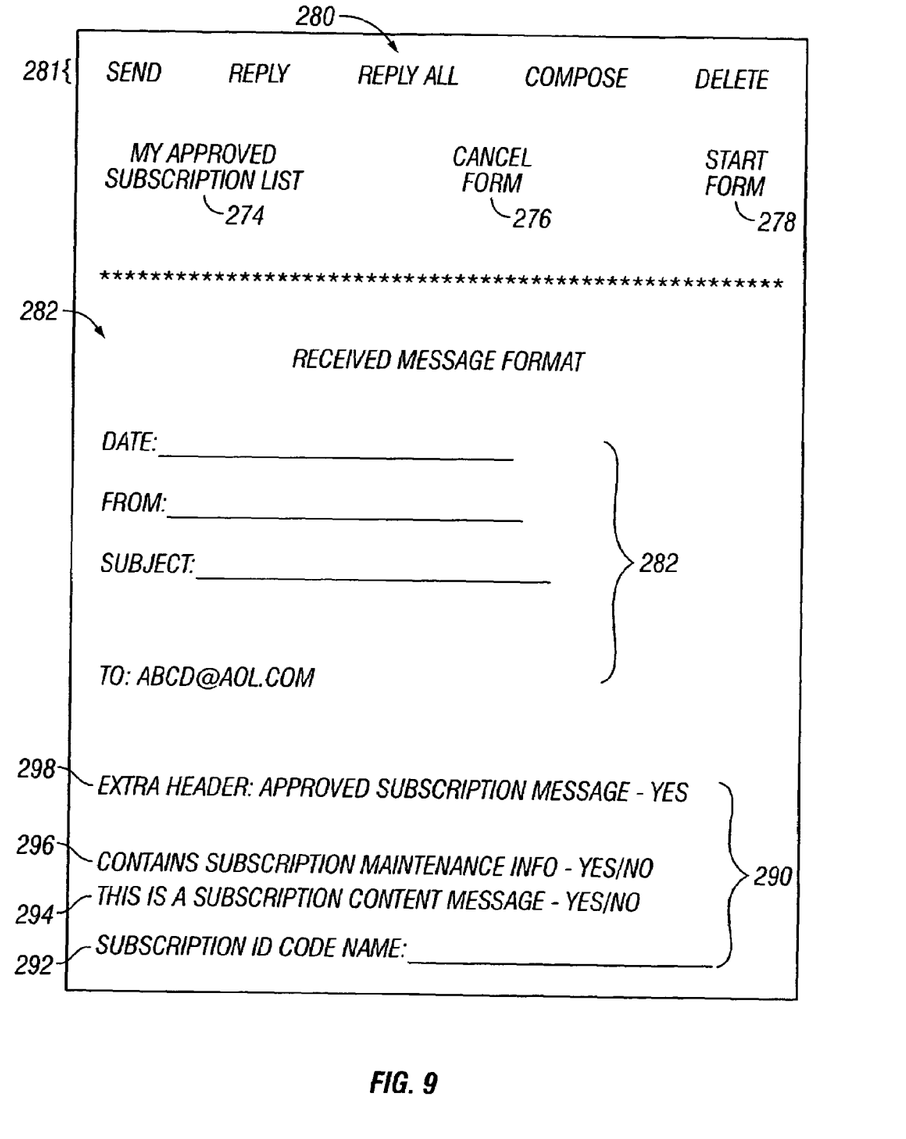
FIG. 9 shows an exemplary screen for an approved subscription message received by a recipient user.

The exemplary embodiment of FIG. 9 shows a standardized background screen 280 having additional user-activated links for access to a current subscription list 274, a subscription cancellation form 276, and a subscription start form 278 (see the exemplary form layouts of FIG. 8).

An exemplary received message format 282 as shown in FIG. 9 may include the usual standard header fields 285, and also display additional subscription-related fields 290 that could be provided individually or collectively by either a message originator or by the subscription manager. Such additional customized information fields may include a subscription ID code name 292, an indicator of a content message 294 and/or a maintenance message 296, as well as a mark or notation identifying an approved subscription message 298.

It will therefore be understood from the foregoing description of exemplary embodiments that the invention provides a new and unique technique to integrate the various mechanisms for initiating, revising and terminating subscription arrangements with third-party and commercial partner originators, as well as to maintain an updated approved subscription list for each individual user recipient of a message service provider.

In addition the invention provides the user with a way to associate specific messages with previously established subscriptions and a centralized automatic method for managing those subscriptions with primary user control and input but with minimal user intervention in the implementation details.

It is to be understood that the invention contemplates revisions, substitutions and improvements in connection with the exemplary embodiments disclosed herein, all without departing from the scope of the invention as set forth in the following claims.

The invention claimed is:

1. A computer implemented method of operating a subscription manager to manage incoming machine readable messages arriving at a communications network having multiple remote user recipients, the method comprising the operations of:
   independent of whether incoming messages have originated from a message originator pre-approved by the incoming messages' addressees, the subscription manager determining if incoming messages are subscription type messages, subscription type messages comprising recurring messages multicast to a plurality of addressees who have previously communicated to originators of the recurring messages their intent to receive such messages;
   responsive to finding that a given message is a subscription type message, the given message having at least one addressee, performing operations comprising:
      determining whether the given message originated from a subscription source pre-approved by the given message's addressee for sending subscribed-to messages to the given message's addressee;
      if the given message originated from a subscription source pre-approved by the given message's addressee, forwarding the given message to the given message's addressee;
      if the given message did not originate from a subscription source pre-approved by the given message's addressee, blocking delivery of the given message to the given message's addressee.

2. The method of claim 1, further comprising:
   responsive to determining that a given message is not a subscription type message, forwarding the given message to its addressee.

3. The method of claim 1, the operation of blocking delivery of the given message comprising at least one of the following:
   1) refusing the given message, 2) returning the given message to its sender, 3) discarding the message, 4) prompting the given message's addressee for confirmation that the addressee requested the given message, and only upon receiving the confirmation, forwarding the given message to the addressee.

4. The method of claim 1, the operation of blocking delivery of the given message further comprising:
   presenting to the given message's addressee an offer of a subscription to a machine-automated service of providing messages related to the given message, and only upon receiving acceptance of the offer, performing operations of:
      forwarding the given message to the addressee;
      precompleting a subscription activation form and providing the precompleted form to the addressee;
      responsive to the addressee's acceptance of the form, on behalf of the addressee obtaining from a source of the given message a subscription to a machine-automated service providing future messages relating to the given message.

5. The method of claim 1, where:
   the subscription manager is operated remotely by a service provider on behalf of the user recipients;
   the operation of blocking delivery of the given message further comprises, only if the given message includes evidence that the given message originated from a recognized business partner of the service provider, presenting the addressee with at least one of the following user-activated options: (1) to receive the message, (2) to obtain from a source of the given message a subscription to a machine-automated service providing future messages relating to the given message.

6. The method of claim 1, where:

the subscription manager is operated remotely by a service provider on behalf of the user recipients;

the operations further comprise, apart from messages directed to the user recipients, the service provider receiving from recognized business affiliates of the service provider indicia identifying subscription type messages originating from said business affiliates;

the operation of determining if incoming messages are subscription type messages comprises examining incoming messages for said indicia.

7. The method of claim 1, where:

the subscription manager is operated remotely by a service provider on behalf of the user recipients;

the operations further comprise maintaining a record of machine-readable identifying indicia provided by business affiliates of the service provider and serving to uniquely identify each said business affiliate;

the operation of determining that a given message is a subscription type message is satisfied by conditions including the given message including any of the identifying indicia.

8. The method of claim 1, where:

the operation of forwarding the given message to the addressee further comprises: including with the forwarded given message an indication that the subscription manager has approved the forwarded given message.

9. The method of claim 1, where:

the operation of, if the given message originated from a subscription source pre-approved by the given message's addressee, forwarding the given message to the addressee further comprises:

determining which of the following that the given message pertains to: subscription maintenance or subscription content;

making a different presentation of the given message to the addressee depending on whether the message pertains to subscription content or subscription maintenance.

10. The method of claim 1, where the operation of, if the given message originated from a subscription source pre-approved by the given message's addressee, the operation of forwarding the given message to the addressee further comprises:

determining which of the following that the given message pertains to: subscription maintenance or subscription content;

only if the given message pertains to subscription maintenance, performing operations comprising:

presenting the given message's addressee with a user-activated cancellation message;

responsive to activation of the cancellation message, the subscription manager negotiating cancellation of the subscription with the subscription source free of further input by the given message's addressee.

11. The method of claim 1, where the operation of, if the given message originated from a subscription source pre-approved by the given message's addressee, forwarding the given message to the addressee further comprises:

detecting whether the given message pertains to a new subscription requiring further acts by the addressee to activate the subscription, and if so, negotiating activation of the subscription with the subscription source free of further input by the given message's addressee.

12. The method of claim 1, the operation of determining whether the given message originated from a subscription source pre-approved by the given message's addressee comprising:

determining whether at least one of the following attributes of the given message matches attributes stored in a subscriptions database: origination address, alias origination address, proxy destination address, message subject, ID code name, other unique identifier field.

13. The method of claim 1, the messages being of at least one of the following types:

email, instant messaging, telephonic, radio, television, wireless, text, audio, visual, and combinations thereof.

14. The method of claim 1, the operations further comprising:

providing participating users with utilities for abbreviated creation, modification, and cancellation of subscription arrangements.

15. An apparatus for managing incoming machine readable messages arriving at a communications network having multiple remote user recipients, comprising:

a subscription manager programmed to perform computer-executed operations comprising:

independent of whether incoming messages have originated from a message originator pre-approved by the incoming messages' addressees, determining if incoming messages are subscription type messages, subscription type messages comprising recurring messages multicast to a plurality of addressees who have previously communicated to originators of the recurring messages their intent to receive such messages;

responsive to finding that a given message is a subscription type message, the given message having at least one addressee, performing operations comprising:

determining whether the given message originated from a subscription source pre-approved by the given message's addressee for sending subscribed-to messages to the given message's addressee;

if the given message originated from a subscription source pre-approved by the given message's addressee, forwarding the given message to the given message's addressee;

if the given message did not originate from a subscription source pre-approved by the given message's addressee, blocking delivery of the given message to the given message's addressee.

16. The apparatus of claim 15, the subscription manager is programmed to perform further operations comprising:

responsive to determining that a given message is not a subscription type message, forwarding the given message to its addressee.

17. The apparatus of claim 15, the subscription manager is programmed such that the operation of blocking delivery of the given message comprises at least one of the following:

1) refusing the given message, 2) returning the given message to its sender, 3) discarding the message, 4) prompting the given message's addressee for confirmation that the addressee requested the given message, and only upon receiving the confirmation, forwarding the given message to the addressee.

18. The apparatus of claim 15, the subscription manager is programmed such that the operation of blocking delivery of the given message further comprises:

presenting to the given message's addressee an offer of a subscription to a machine-automated service of providing messages related to the given message, and only upon receiving acceptance of the offer, performing operations of:

forwarding the given message to the addressee;

precompleting a subscription activation form and providing the precompleted form to the addressee;

responsive to the addressee's acceptance of the form, on behalf of the addressee obtaining from a source of the given message a subscription to a machine automated service providing future messages relating to the given message.

19. The apparatus of claim 15, where:

the subscription manager is operated remotely by a service provider on behalf of the user recipients;

the subscription manager is programmed such that the operation of blocking delivery of the given message further comprises, only if the given message includes evidence that the given message originated from a recognized business partner of the service provider, presenting the addressee with at least one of the following user-activated options: (1) to receive the message, (2) to obtain from a source of the given message a subscription to a machine-automated service providing future messages relating to the given message.

20. The apparatus of claim 15, where:

the subscription manager is operated remotely by a service provider on behalf of the user recipients, where apart from messages directed to the user recipients the service provider receives from recognized business affiliates of the service provider indicia identifying subscription type messages originating from said business affiliates;

the subscription manager is programmed such that the operation of determining if incoming messages are subscription type messages comprises examining incoming messages for said indicia.

21. The apparatus of claim 15, where:

the subscription manager is operated remotely by a service provider on behalf of the user recipients;

the apparatus further comprises a record of machine-readable identifying indicia provided by business affiliates of the service provider and serving to uniquely identify each said business affiliate;

the subscription manager is programmed such that the operation of determining that a given message is a subscription type message is satisfied by conditions including the given message including any of the identifying indicia.

22. The apparatus of claim 15, where:

the subscription manager is programmed such that the operation of forwarding the given message to the addressee further comprises:

including with the forwarded given message an indication that the subscription manager has approved the forwarded given message.

23. The apparatus of claim 15, where:

the subscription manager is programmed such that the operation of, if the given message originated from a subscription source pre-approved by the given message's addressee, forwarding the given message to the addressee further comprises:

determining which of the following that the given message pertains to: subscription maintenance or subscription content;

making a different presentation of the given message to the addressee depending on whether the message pertains to subscription content or subscription maintenance.

24. The apparatus of claim 15, where the subscription manager is programmed such that the operation of, if the given message originated from a subscription source pre-approved by the given message's addressee, the operation of forwarding the given message to the addressee further comprises:

determining which of the following that the given message pertains to: subscription maintenance or subscription content;

only if the given message pertains to subscription maintenance, performing operations comprising:

presenting the given message's addressee with a user-activated cancellation message;

responsive to activation of the cancellation message, the subscription manager negotiating cancellation of the subscription with the subscription source free of further input by the given message's addressee.

25. The apparatus of claim 15, where the subscription manager is programmed such that the operation of, if the given message originated from a subscription source pre-approved by the given message's addressee, forwarding the given message to the addressee further comprises:

detecting whether the given message pertains to a new subscription requiring further acts by the addressee to activate the subscription, and if so, negotiating activation of the subscription with the subscription source free of further input by the given message's addressee.

26. The apparatus of claim 15, where:

the apparatus further comprises a subscriptions database;

the subscription manager is programmed such that the operation of determining whether the given message originated from a subscription source pre approved by the given message's addressee comprises:

determining whether at least one of the following attributes of the given message matches attributes stored in the subscriptions database: origination address, alias origination address, proxy destination address, message subject, ID code name, other unique identifier field.

27. The apparatus of claim 15, the messages being of at least one of the following types:

email, instant messaging, telephonic, radio, television, wireless, text, audio, visual, and combinations thereof.

28. The apparatus of claim 15, the subscription manager is programmed to perform further operations comprising:

providing participating users with utilities for abbreviated creation, modification, and cancellation of subscription arrangements.

29. The method of claim 15, the operations further comprising:

the subscription manager screening outgoing machine readable messages of the user recipients to determine if said messages pertain to a subscription;

when a given message pertains to cancellation of a subscription, completing and then attaching a prescribed cancel data form to the given message;

when a subject message pertains to a new subscription, completing and then attaching a prescribed new subscription form to the given message;

transmitting each outgoing message and any attachments to a subscription source address.

30. A method of managing incoming machine readable messages arriving at a communications services provider for delivery to multiple remote user recipient customers of the communications services provider, where the communications services provider has commercial relationships with one or more affiliates that serve as known originators of subscription messages comprising messages repeatedly transmitted to multiple addressees that have pre-approved receipt of such subscription messages, the method comprising the operations of:

apart from messages arriving at the communications services provider for delivery to customers, the communications services provider receiving from each affiliate pre-agreed indicia identifying subscription messages originated by that affiliate;

responsive to receiving incoming machine readable messages addressed to remotely located user recipient customers of the communications services provider, the communications services provider examining the incoming machine readable messages for presence of the pre-agreed indicia to determine if the incoming machine readable messages originate with any of the commercial affiliates;

responsive to absence of the pre-agreed indicia in a given message, the given message having at least one addressee, and independent of whether the given message originated with a message originator pre-approved by the given message's addressee for sending subscribed-to messages to the addressee, the communications services provider forwarding the given message to its addressee;

responsive to presence of the pre-agreed indicia in a subject message, the subject message having at least one addressee, the communications services provider determining whether the subject message originated from a message originator that is pre-approved by the subject message's addressee for sending subscribed-to messages to the subject message's addressee;

if so, forwarding the given message to the subject message's addressee;

if not, blocking delivery of the given message to the subject message's addressee.

* * * * *